Feb. 1, 1966    W. R. EPPERLY ET AL    3,233,003
PURIFICATION OF N-PARAFFINS BY ADSORPTION
Filed Sept. 12, 1962    4 Sheets-Sheet 1

WILLIAM R. EPPERLY
PATRICK P. McCALL    Inventors
WILLIAM J. ASHER

By David A. Roth
Patent Attorney

Feb. 1, 1966  W. R. EPPERLY ET AL  3,233,003
PURIFICATION OF N-PARAFFINS BY ADSORPTION
Filed Sept. 12, 1962  4 Sheets-Sheet 4

WILLIAM R. EPPERLY
PATRICK P. McCALL   Inventors
WILLIAM J. ASHER

By David A. Roth
Patent Attorney

United States Patent Office 3,233,003
Patented Feb. 1, 1966

3,233,003
PURIFICATION OF N-PARAFFINS BY ADSORPTION
William R. Epperly, Murray Hill, Patrick P. McCall, New Monmouth, and William J. Asher, Cranford, N.J., assignors to Esso Research and Engineering Company, a corporation of Delaware
Filed Sept. 12, 1962, Ser. No. 223,057
5 Claims. (Cl. 260—676)

This invention relates to a process for effecting separation of aromatics and/or nonhydrocarbons from saturated hydrocarbons and/or olefins, as well as separating olefins from saturated hydrocarbons. In particular it relates to a process for purifying saturated hydrocarbons and/or olefins. Even more particularly, it relates to a low temperature, liquid phase, adsorption process for purifying saturated hydrocarbons, e.g., n-paraffins which utilizes a silica gel adsorbent and a displacing agent. It also relates to a process of desorbing adsorbents.

The use of silica gel adsorption for the removal and/or recovery of aromatics, sulfur compounds, nitrogen compounds, oxygen compounds, and/or color bodies from various hydrocarbon streams has long been recognized. The major problem in applying this technique to commercial uses has been the difficulty of desorbing the adsorbed components, i.e., the aromatics and nonhydrocarbons from the gel. Large amounts of liquid wash solvents such as n-heptane, benzene, acetone, alcohol, or pyridine were normally required and the resulting process was expensive. This invention concerns an improved technique for desorption.

In this invention, desorption preferably gas phase is effected with for instance a $C_1$ to $C_5$ alkylamine, $NH_3$, or sulfur dioxide. These compounds are strongly adsorbed on silica gel, and effectively displace an aromatic or nonhydrocarbon adsorbate. As a result, a relatively small amount of desorbent is required. Thus, these displacing agents are extremely effective. An additional advantage of the invention is the simplicity of the separation of the desorbent from the hydrocarbon fractions. For instance a flash separation is all that is required to remove $NH_3$ from the hydrocarbon stream.

These displacing agents are also effective for desorbing such other adsorbents as alumina, clays, bauxite, magnesia, or $SiO_2/Al_2O_3$. For specific separations, it is sometimes advantageous to use several adsorbents, each of which is best suited for the adsorption of a particular class of compounds to be removed and desorb all of them using the same displacing agent, i.e., either $NH_3$, $SO_2$ or a $C_1$ to $C_5$ alkylamine.

A particularly preferred facet of the invention is the purification of n-paraffins. Normal paraffins are items of commerce which are finding a rapidly growing market. For instance, in the manufacture of synthetic detergents such as sulfonated alkyl aryls and alkyl sulfonates, it is desirable to utilize straight chain paraffins as the alkyl substituent as contrasted to branch chain, alkyl substituents. Not only does this impart better detergent properties to the ultimate sulfonate but such detergents are biodegradable. This is of prime importance where it is desired to avoid pollution of various natural resources such as streams, rivers, etc. There are, of course, other important uses of normal paraffinic hydrocarbons such as flame proofing agents, intermediates in aromatization, solvents, reaction diluents and the like. Isoparaffins are generally disadvantageous for the above uses. They are difficult to fully chlorinate to make flame proofing agents, have low rates of aromatization generally, and are not stable enough for reaction diluents in some reactions. Although such n-paraffins are desirable for many uses, there are some specialized uses, such as solvents, for which isoparaffins or cycloparaffins are preferred. Although the purification of n-paraffins is used throughout this specification as a specific embodiment of the invention, it should be kept in mind that the process of the invention is useful for separating aromatics and nonhydrocarbons, i.e., impurities from saturated hydrocarbons. For instance, some uses of saturated hydrocarbons (normal, iso, cyclo) are as follows:

In the naphtha range as intermediate quality solvents
In the kerosene range as intermediate quality solvents, high quality kerosene for lamp oil, jet fuel
In the lube range as white oils and high V.I. oils.

The instant invention is concerned with the purification of hydrocarbons, for instance, n-paraffins, regardless of their source. By way of illustration, U.S. Patent 2,899,379 teaches a method of obtaining n-paraffins which involves adsorbing a hydrocarbon stream containing n-paraffins on a molecular sieve and desorbing the sieve to obtain a substantially normal paraffin desorbate. Invariably, any process designed to produce n-paraffins produces a product which also contains relatively small amounts of contaminants such as aromatics, sulfur and color bodies.

Such a product must be further treated to remove the color bodies and other impurities in order to meet stringent consumer specifications. These specifications are stringent since, for instance, very small amounts of aromatics and sulfur can act as catalyst poisons and reaction stoppers. Therefore, it is essential in many processes which utilize n-paraffins or other saturated hydrocarbon products that these contaminants be at a minimum. Moreover, the purity, odor, appearance, and color of the saturated hydrocarbons, e.g., n-paraffin product, is an important factor in competitive marketing. What will be a contaminant or impurity will depend, to some extent, on the particular hydrocarbon being purified.

It has now been discovered and forms the essence of this invention that saturated hydrocarbons and/or olefins, particularly n-paraffins, which contain impurities can be easily and efficiently purified by an adsorbent process which is described herein. In brief, this treatment involves adsorption of the hydrocarbon, e.g. n-paraffin, stream on silica gel at ambient temperatures in liquid phase followed by drainage of feed from the bed and high temperature desorption of the silica gel with a displacing agent (e.g. a desorbing medium) preferably gas phase.

A displacing agent is defined as a polar or polarizable material having an appreciable affinity for an adsorbent compared with the material to be desorbed. The displacing agent will also generally have a heat of adsorption approximately equal to the material, i.e., impurity that it is desired to desorb. Displacing agents are also referred to as desorbents, displacing mediums, and desorbing mediums. Suitable displacing agents for the process of this invention include $SO_2$, $NH_3$, $C_1$ to $C_5$ alcohols, glycols, esters, hydrogenated compounds such as methyl and ethyl chloride, methyl fluoride, nitrated compounds such as nitromethane, carbon dioxide, and the like. A preferred displacing agent has the general formula:

wherein $R_1$, $R_2$ and $R_3$ are selected from the group consisting of hydrogen and $C_1$ to $C_5$ alkyl radicals. Thus the desorbing material includes $NH_3$ and the $C_1$ to $C_{15}$ primary, secondary, and tertiary amines with $NH_3$ being most preferred and the $C_1$ to $C_5$ primary amines being next in order of preference.

It is, of course, very desirable to utilize a process of this type in a continuous fashion. Therefore, if it is desired to reuse the silica gel after each desorption step, it is preferred to strip the desorbing medium, e.g., $NH_3$ from the silica gel prior to the next adsorption step.

The hydrocarbons that can be purified by means of this process include $C_3$ to $C_{60}$, preferably $C_5$ to $C_{40}$, and especially preferable $C_7$ to $C_{20}$ hydrocarbons such as saturates and unsaturates including isoparaffins, cycloparaffins, and olefins.

In general, after the adsorption step it is preferred to drain liquid feed from the silica gel since, as the bed becomes saturated with impurities, it also becomes saturated with feed. This draining can take place in any convenient manner such as by applying a vacuum to the bed or an inert gas. Preferably the drained liquid passes out of the bed through the feed input line. The drained liquid does not necessarily have to go back to feed but clearly significant benefits in yield can be obtained if it does.

Desorption takes place at a higher temperature, e.g. 400° to 800° F., than adsorption, e.g. 0° to 300° F. The The preferred adsorbents are clay, alumina, and a silica gel for the specific process conditions disclosed herein which has a pore size of about 10 to 50, preferably 10 to 35 and most preferably 15 to 30 Angstrom units. When referring herein to pore sizes it is meant *average pore diameters*. The larger the pore diameter of the silica gel or other adsorbent, the greater the ease of desorption of impurities. Therefore, silica gel having relatively large pore diameters of 51 to 300 preferably 75 to 200 and most preferably 100 to 175 Angstrom units can be used in a process where desorption temperatures are of the order of 200° to 400° F. The relatively large diameter silica gel can be used per se or as a guard bed.

Although not essential, a guard bed of alumina or silica gel, the silica gel having a pore diameter of 51 to 300 Angstroms can be profitably employed to adsorb the most easily adsorbed impurities and prevent early loss of capacity of the preferred silica gel.

The following table summarizes the operating, preferred, and especially preferred conditions for the processes of the invention.

|  | Operating | Preferred | Especially Preferred |
|---|---|---|---|
| Adsorption: | | | |
|   Temperature, °F | 0 to 300 | 50 to 200 | 60 to 150. |
|   Pressure, p.s.i.a | 15 to 200 | 20 to 100 | 20 to 65. |
|   Feed Rate, w./w./hr | 0.05 to 10.0 | 0.1 to 3.0 | 0.3 to 2.0. |
|   Feed (Hydrocarbon) | $C_3$ to $C_{60}$ | $C_5$ to $C_{40}$ | $C_7$ to $C_{20}$. |
| Heating and Desorption: | | | |
|   Final Temp., °F | 400 to 800 | 450 to 700 | 500 to 650. |
|   Pressure, p.s.i.a | 1 to 200 | 15 to 100 | 20 to 50. |
|   Size of drainage and 1st desorbate, as percent of fresh feed. | 5 to 75 | 10 to 50 | 15 to 40. |
| Displacing Agent | $N{-}R_2 \begin{smallmatrix}R_1\\\\R_3\end{smallmatrix}$ (¹) | $NH_2{-}R_4$ (²) | $NH_3$, $SO_2$. |
| Displacing Agent Rate, w./w./hr. | 0.05 to 10 | 0.1 to 5.0 | 0.3 to 2.0. |
| Desorbent Stripping Conditions: | | | |
|   Temp., °F | 400 to 800 | 450 to 700 | 500 to 650. |
|   Pressure, p.s.i.a | 0.1 to 200 | 0.5 to 100 | 2 to 50. |
|   Stripping medium | Inert gases, saturated hydrocarbons, feed to process, vacuum. | Saturated hydrocarbons, feed to process, vacuum. | Product hydrocarbons or vacuum. |
| Cooling Step (and Desorbent Stripping): | | | |
|   Final Temp., °F | 0 to 300 | 50 to 200 | 60 to 150. |
|   Pressure, p.s.i.a | 15 to 200 | 20 to 100 | 20 to 65. |
|   Cooling Medium ³ | Inert gases, saturated product hydrocarbons, feed to process. | Saturated product hydrocarbons, feed to process. | Product hydrocarbons, or feed to process. |
| Adsorbent | Silica gel, alumina, and/or clay | Silica gel with or without guard bed of alumina or clay at feed inlet. | Silica gel with alumina guard bed at feed inlet. |

¹ $R_1$, $R_2$ and $R_3$ are selected from the group consisting of H and $C_1$ to $C_5$ alkyl groups.
² $R_4$ is selected from the group consisting of $C_1$ to $C_5$ alkyl groups.
³ Also includes the concept of indirect heat exchange, such as with a cooling coil where no cooling medium is used.

heating of the bed required for optimum desorption can be accomplished by means of a heating means such as a heating element in the bed or by the introduction of displacing agent heated to desorption temperatures or slightly higher if desired.

After desorption, displacing agent remains on the bed. The decision as to whether the silica gel should be stripped of displacing agent is dependent primarily on the amount of displacing agent adsorbed by the silica gel.

If relatively large quantities of displacing agent are present on the gel stripping is most advantageous. Generally more displacing agent is adsorbed by the gel as temperatures are decreased. At the temperatures used for desorption, stripping is not necessary although it is preferred since greater adsorbent capacities and efficiencies can be obtained through stripping. This is particularly true when the desorption temperatures are at the lower range of desorption, i.e. about 400° to 600° F.

After stripping or, if stripping is not employed, after desorption, the bed must be cooled down to adsorption temperatures. This can be accomplished by convenient conventional means such as by a cooling coil in the adsorbent bed or by using inert gases, feed, product or the like, which are at about adsorption temperatures, i.e. 0 to 300° F.

The invention can be fully understood by referring to both the preceding and following description, the claims taken in conjunction therewith, and by the accompanying drawings wherein:

Figure 1:
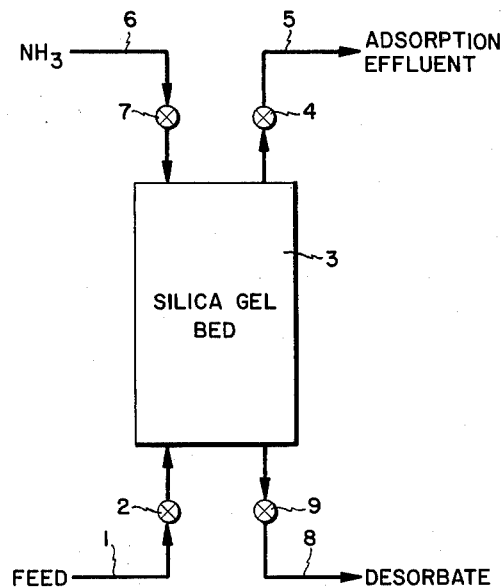
FIG. 1 is a schematic diagram of a silica gel bed with means for charging feed to the bed, heating and desorbing the bed, stripping the bed, and cooling.

Referring now to FIGURE 1, feed, comprising either individual n-paraffins selected from the group of $C_7$ to $C_{20}$ paraffins or any combination thereof or an n-paraffin smear made up of any combination of n-paraffins boiling in the $C_7$ to $C_{20}$ range is fed into line 1 through valve 2 and then into silica gel bed 3. This is continued until just before breakthrough of impurities at the top of silica gel bed 3. The adsorption effluent which is the pure product desired is withdrawn at the top of bed 3 through valve 4 and line 5 to storage. At a time just prior to breakthrough, valves 2 and 4 are closed and ammonia is introduced at an elevated temperature of about 500 to 650° F. into bed 3 through line 6 and valve 7. The bed may be heated by passing through it enough hot ammonia to satisfy its heat capacity or by indirect heat exchange with a coil in the bed. Liquid feed is drained from the bed either before or after the introduction of ammonia. The first effluent after drainage is feed which was held up in the bed even after drainage. This can be recycled to feed if desired for improved yields. This feed desorbed color comes out through line 1. The NH$_3$ desorbs adsorbed color, aromatics, and sulfur. The rest of the desorbate containing the impurities is driven from sieve bed 3 through line 8 and valve 9 until the bed is sufficiently desorbed. Then valves 7 and 9 are closed.

When the desorption step is completed, the bed can be stripped to remove desorbent and then cooled to the adsorption temperature, or the stripping step can be excluded. To strip the bed, inert gas or hot adsorption effluent can be introduced through line 6, valve 7, etc. The effluent stream is cooled and the product separated. The desorbent may also be removed by reducing the bed pressure to 0.1 to 15 p.s.i.a., preferably 0.5 to 10 p.s.i.a. without purge.

Cooling to the desired adsorption temperature can be accomplished by using indirect heat transfer (a cooling coil in the bed) or direct transfer by introducing feed or product at the adsorption temperature through line 1, valve 2. The hot vapors from the cooling medium tend to remove any ammonia which is left in the bed. The effluent passes through valve 4, line 5, and is cooled and separated. In the above embodiment, the process conditions are those listed in the especially preferred column of the above table unless otherwise designated.

The invention is further illustrated by the following examples.

EXAMPLE 1

Importance of adsorption temperature

Figure 2:
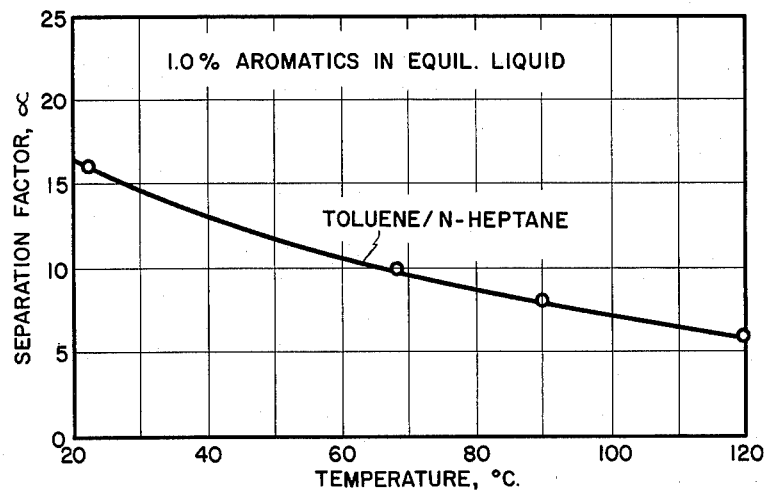
FIGURES 2–6 are graphs of data obtained in the examples.

In silica gel adsorption, it is important to minimize the adsorption temperature to obtain maximum capacity and selectivity. An example from E. R. Schmelzer, M. C. Molstad, and P. F. Hagerty (Chem. Eng. Progress Symposium Series 55, 209 (1959)) shows that the capacity of silica gel for toluene in the presence of n-heptane is 6.29 wt./100 wt. of gel at 24.5° C. versus only 3.41 wt./100 wt. at 52.4° C. The data of Hirschler and Mertes (Ind. Eng. Chem. 47, 193) show that the separation factor (selectivity) is also reduced by increasing temperatures (see FIGURE 2).

Thus, the need to minimize temperature necessitates the use of liquid phase adsorption for hydrocarbons in the boiling range of this invention.

EXAMPLE 2

Effect of NH$_3$ on adsorption of aromatics

To show the effect of ammonia on the adsorption of aromatics, runs were made with a bed of Davison Grade 12 silica gel (average pore diameter about 22 Angstrom units) using a feed of C$_7$ to C$_{19}$ n-paraffins containing 1.1% aromatics. Adsorption was at about 75° F. with a feed rate of 0.5 w./w./hr. Desorption was at 400° F. and 15 p.s.i.a. with 0.9 w./w. to 1.3 w./w. of ammonia at 0.59 w./w./hr.

The results show that ammonia interferes with the adsorption of aromatics but can be tolerated. When the bed was preloaded with ammonia at 80° F. and 30 p.s.i.a. in cycle number 3, the capacity of the bed for aromatics was very low and the adsorption effluent contained no less than 0.6% aromatics. (See FIGURE 3.) In the next cycle, the capacity was restored by stripping the bed with 480 cc./gm. of nitrogen at 400° F. and 15 p.s.i.a. after the desorption step.

Figure 3:
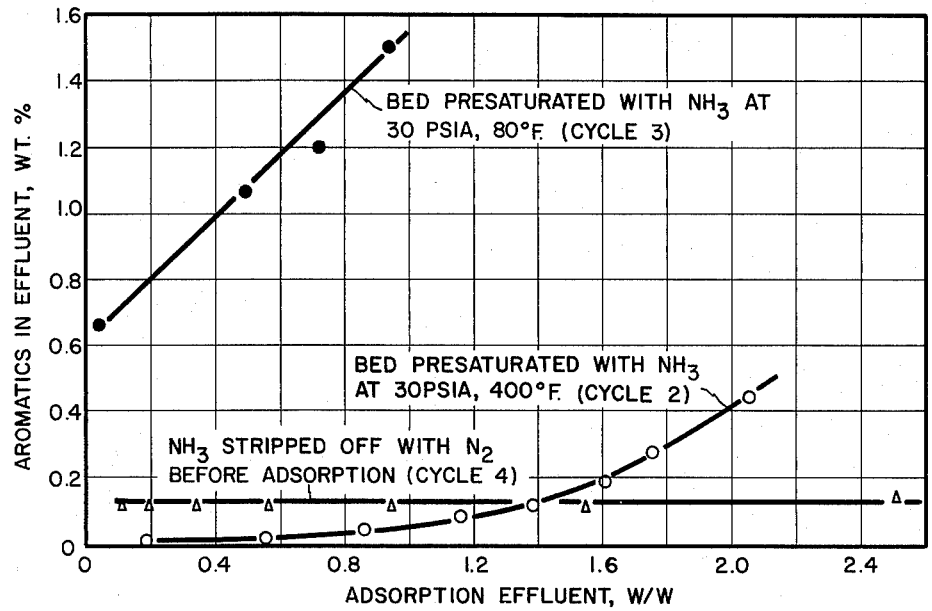

Adsorption can also be carried out without stripping after a desorption step. In cycle number 2, adsorption was carried out after desorption at 400° F. and 30 p.s.i.a. with ammonia and no stripping as the bed was cooled. The data in FIGURE 3 show that appreciable capacity for aromatics was obtained although it is lower than after stripping with nitrogen (in cycle 4). Thus, the decision as to whether stripping will be desirable depends primarily on the amount of displacing agent in the bed.

EXAMPLE 3

Significance of desorption temperature

Several cyclic runs were made using a fixed bed containing 50 grams of Davison Grade 12 silica gel (28/200 mesh) and 40 grams of F–1 alumina (28/200 mesh) at the feed inlet to show that capacity maintenance depends on the desorption temperature. The feed was a C$_7$ to C$_{19}$ n-paraffin fraction containing 1.1 wt. percent aromatics and 0.023 wt. percent sulfur. The feed color was 11¾ TR. Adsorption was carried out with about 3.0 w. feed/w. gel at 95° F., 30 p.s.i.a., and 0.5 w./w./hr. Then the bed was heated to either 385° F. or 530° F. and desorbed with 1.0 to 1.3 w./w. of ammonia at 30 p.s.i.a. and 0.67 w./w./hr. The bed was cooled to the adsorption temperature with a nitrogen purge of 2200 standard cc./gm. of adsorbent/hour for 2 hours at 30 p.s.i.a. Then adsorption was carried out again.

Figure 4:
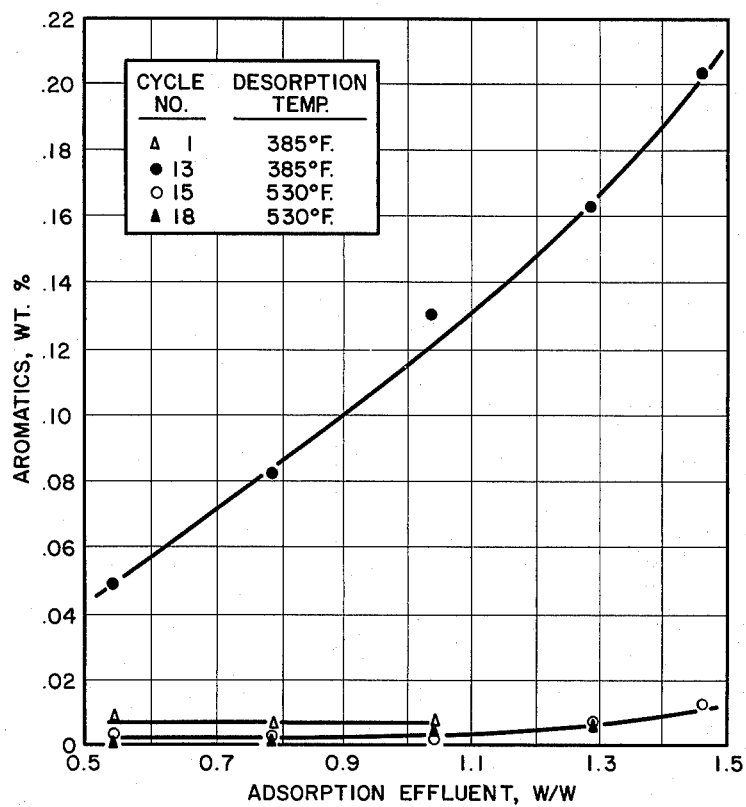
Figure 5:
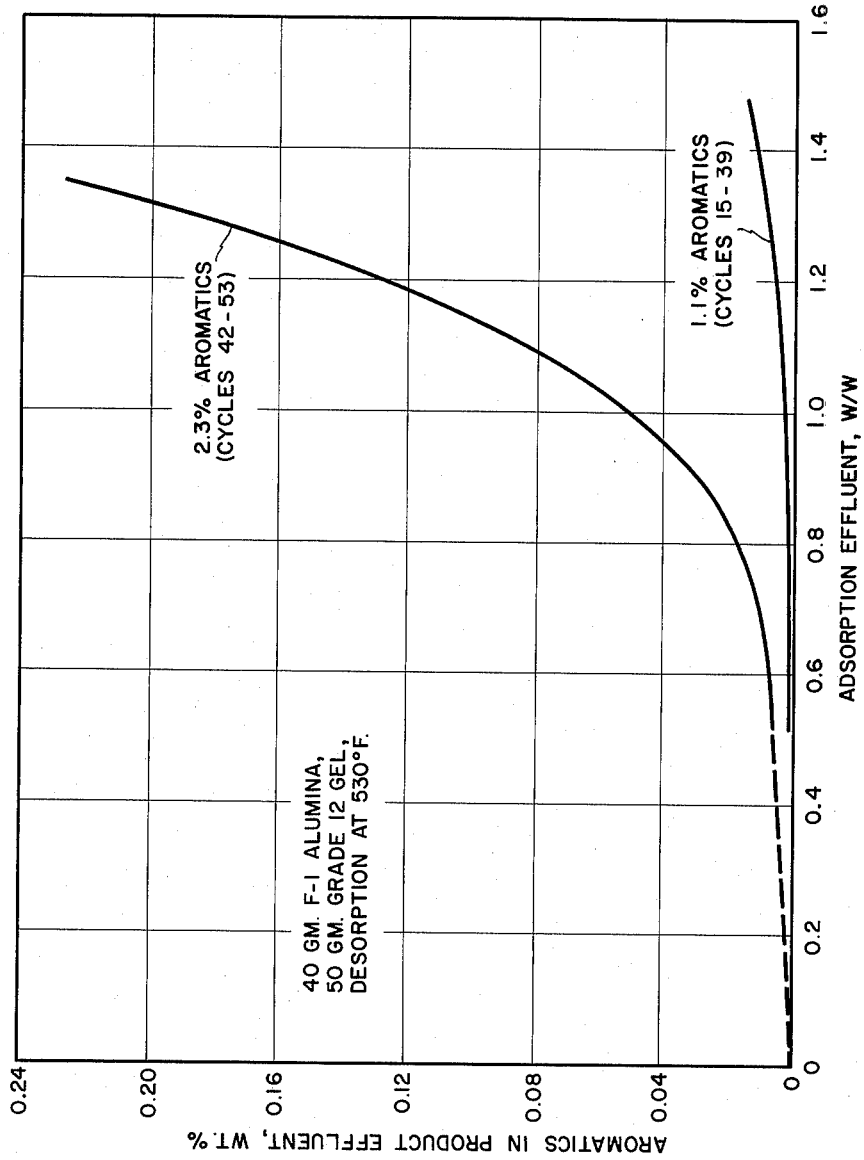

In the first cycle, the aromatic content of the adsorption effluent was 0.004 wt. percent and the sulfur content 0.0007 wt. percent. The product was water white. However, the aromatic level began to increase on cycle 4, and by cycle 13 the capacity had dropped considerably. (See FIGURE 4.) This lost capacity was restored by raising the desorption temperature to 530° F. as shown by the attachment. The operation was then continued for 53 cycles with no indication of deactivation. (See FIGURE 5.) FIGURE 5 shows capacity maintenance data for two discrete paraffin feed streams. One contained 2.3% aromatics and the other 1.1% aromatics. As can be seen after 53 cycles even the stream that had 2.3% aromatics in it had only slightly more than 0.20 wt. percent aromatics in the final product effluent. Sulfur removal to 0.001 wt. percent or less was obtained, and the product was water white.

EXAMPLE 4

To show the beneficial effect of a guard bed on capacity maintenance, cyclic runs were made with two different adsorbent beds—one containing 50 grams of Davison Grade 12 silica gel and 40 grams of F–1 alumina at the feed inlet; and the other containing only Grade 12 silica gel. The feed in the first run was C$_7$ to C$_{19}$ n-paraffin containing 1.1% aromatics and in the latter case C$_{12}$ to C$_{18}$ n-paraffins containing 2.3% aromatics. Adsorption was at 75–95° F. and 0.5 w./w./hr. Desorption was at 385–400° F. with about 0.9 to 1.3 w./w. of ammonia at about 0.6 w./w./hr. The beds were cooled to the adsorption temperature with a nitrogen purge.

The degree of removal of aromatics initially in the adsorption step was over 99% in both runs on the first cycle. However, deactivation was much more rapid with silica gel alone. After 4 cycles, the degree of removal was 99.3% wtih alumina/silica gel versus 95.2% with silica gel.

EXAMPLE 5

To show that silica gel alone can be used to remove aromatics in the invention, a cyclic run was made with C$_7$ to C$_{19}$ n-paraffins containing 1.1% aromatics and 0.023 wt. percent sulfur, and Davison Grade 70 wide pore silica gel (average pore diameter about 140 Angstrom units), 28/200 mesh. Adsorption was at 80 to 90° F., 30 p.s.i.a., and 1 w./w./hr. for 340 to 390 minutes. Desorption was at about 350° F., 30 p.s.i.a., and 1.2 w./w./hr. of ammonia for 120 minutes. The bed was cooled with a nitrogen purge to the adsorption temperature.

Figure 6:
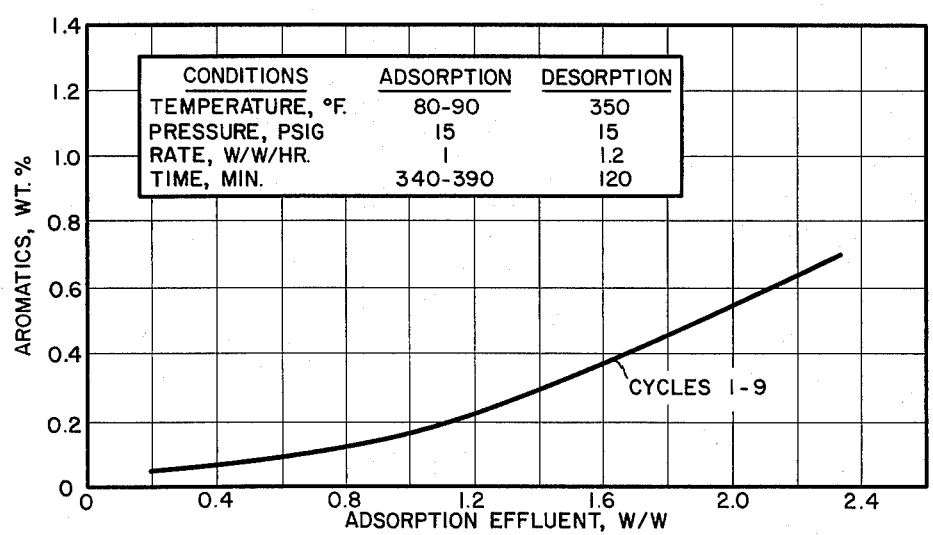

Aromatics removal to less than 0.1% was obtained, and there was no indication of deactivation in 9 cycles. (See FIGURE 6.) Sulfur removal to as low as 0.0015 wt. percent was also obtained.

The absence of deactivation with a desorption temperature as low as 350° F., which temperature led to deactivation in the run of Example 4, is due to differences in the adsorptive properties of the silica gels used since the wide pore silica gel can be desorbed more easily.

In the above examples the $C_7$ to $C_{19}$ n-paraffin feed was derived from an Aramco crude. The specifications were as follows:

|  | Wt. percent |
|---|---|
| n-Paraffins | 97.9 |
| Isoparaffins+naphthenes | 1.1 |
| Aromatics | 1.1 |

In the final products of the examples there was approximately the same wt. percent of isoparaffins and naphthenes as there were in the feed stock before treatment. This demonstrates that other saturated hydrocarbons can also be purified of aromatics etc. by the process of this invention.

Although the foregoing specification has described the invention with a certain degree of particularity, it will be understood that modifications and variations therein can be employed without departing from the spirit of the invention as hereinafter claimed.

What is claimed is:

1. A process for purifying n-paraffins which comprises in combination the steps of:
    (a) Passing a liquid stream containing n-paraffins and impurities through silica gel,
    (b) Desorbing said silica gel with a gaseous displacing agent, at a temperature of 400° to 800° F., chosen from the group consisting of $SO_2$ and

wherein $R_1$, $R_2$, and $R_3$ can be hydrogen or a $C_1$ to $C_5$ alkyl radical, and
    (c) Stripping said silica gel of said displacing agent.

2. A process according to claim 1 wherein said displacing agent is $NH_3$.

3. A process according to claim 1 wherein said impurities comprise sulfur, and aromatics.

4. A process for purifying n-paraffins which comprises in combination the steps of:
    (a) Passing a $C_7$ to $C_{20}$ normal paraffin stream containing aromatics and sulfur through silica gel at a temperature of 60 to 150° F., a pressure of 20 to 65° p.s.i.a., and a feed rate of 0.3 to 2.0 w./w./hr.
    (b) Desorbing said silica gel with ammonia at a pressure of 20 to 50 p.s.i.a., and a temperature of 500 to 650° F.
    (c) Stripping said silica gel of $NH_3$ at a pressure of 2 to 50 p.s.i.a., a temperature of 500 to 650° F.

5. A method according to claim 4 wherein said silica gel has an alumina guard bed.

References Cited by the Examiner
UNITED STATES PATENTS

| 2,425,535 | 8/1947 | Hibshman | 260—674 |
| 2,773,803 | 12/1956 | Fear et al. | 260—674 |
| 2,899,379 | 8/1959 | Wilchinsky et al. | 260—676 X |
| 2,963,520 | 12/1960 | Neal | 260—676 |
| 3,030,431 | 4/1962 | Mattox et al. | 260—676 |
| 3,070,542 | 12/1962 | Asher et al. | 260—676 |
| 3,098,814 | 7/1963 | Epperly | 760—674 |

FOREIGN PATENTS

| 845,551 | 8/1960 | Great Britain. |

OTHER REFERENCES

Gebler et al.: "Chemical Abstracts," 1960, vol. 54, pages 6088g.

ALPHONSO D. SULLIVAN, *Primary Examiner.*

PAUL M. COUGHLAN, *Examiner.*